United States Patent
Bhow

(10) Patent No.: US 9,673,989 B2
(45) Date of Patent: Jun. 6, 2017

(54) METHOD AND SYSTEMS FOR CONNECTION INTO CONFERENCE CALLS

(75) Inventor: Gunjan Dhanesh Bhow, Menlo Park, CA (US)

(73) Assignee: Plantronics, Inc., Santa Cruz, CA (US)

( * ) Notice: Subject to any disclaimer, the term of this patent is extended or adjusted under 35 U.S.C. 154(b) by 760 days.

(21) Appl. No.: 13/230,829

(22) Filed: Sep. 12, 2011

(65) Prior Publication Data
US 2013/0064142 A1    Mar. 14, 2013

(51) Int. Cl.
H04L 12/16 (2006.01)
H04L 12/18 (2006.01)

(52) U.S. Cl.
CPC .................. H04L 12/1818 (2013.01)

(58) Field of Classification Search
USPC ............... 370/260; 379/202.01; 709/227
See application file for complete search history.

(56) References Cited

U.S. PATENT DOCUMENTS

| 8,121,547 B2 | 2/2012 | Findlay et al. | |
| 2010/0098230 A1* | 4/2010 | Bhow | 379/202.01 |
| 2010/0211425 A1* | 8/2010 | Govindarajan | 705/8 |
| 2011/0205125 A1* | 8/2011 | Lin et al. | 342/451 |
| 2011/0225200 A1* | 9/2011 | Danis et al. | 707/783 |

OTHER PUBLICATIONS

Kenneth Kannapan, et al., Auto-Dial and Connection into Conference Calls with Attendee Status Broadcast, U.S. Appl. No. 13/044,734, filed Mar. 10, 2011.

* cited by examiner

*Primary Examiner* — Donald Mills
*Assistant Examiner* — Henry Baron
(74) *Attorney, Agent, or Firm* — Chuang Intellectual Property Law

(57) ABSTRACT

Methods and systems for auto-connection into conference calls are disclosed. An attendee receives a meeting request at a computing device. At the proposed date and time of the meeting, the conference call dial-in number is automatically dialed and a first call is established. The conference call meeting identification number is transmitted over the first call. A second call to a second device is initiated. Upon establishing the second call, the first and second calls are linked/conferenced.

22 Claims, 15 Drawing Sheets

| Name | Location | Business Phone | Capacity | Description | E-mail Address |
|---|---|---|---|---|---|
| Conference Room A1 | NYC | 719-555-1110 | 8 | speakerph, video | confA1@company.com |
| Conference Room B1 | NYC | 719-555-1111 | 15 | speakerph, video | confB1@company.com |
| Conference Room B2 | NYC | 719-555-1112 | 7 | speakerph, video | confB2@company.com |
| Office A1 | NYC | 719-555-1113 | 4 | invd office | jsmith@company.com |
| Office A2 | NYC | 719-555-1114 | 4 | invd office | mgritt@company.com |
| Office A3 | NYC | 719-555-1115 | 4 | invd office | frankz@company.com |

FIG. 5A

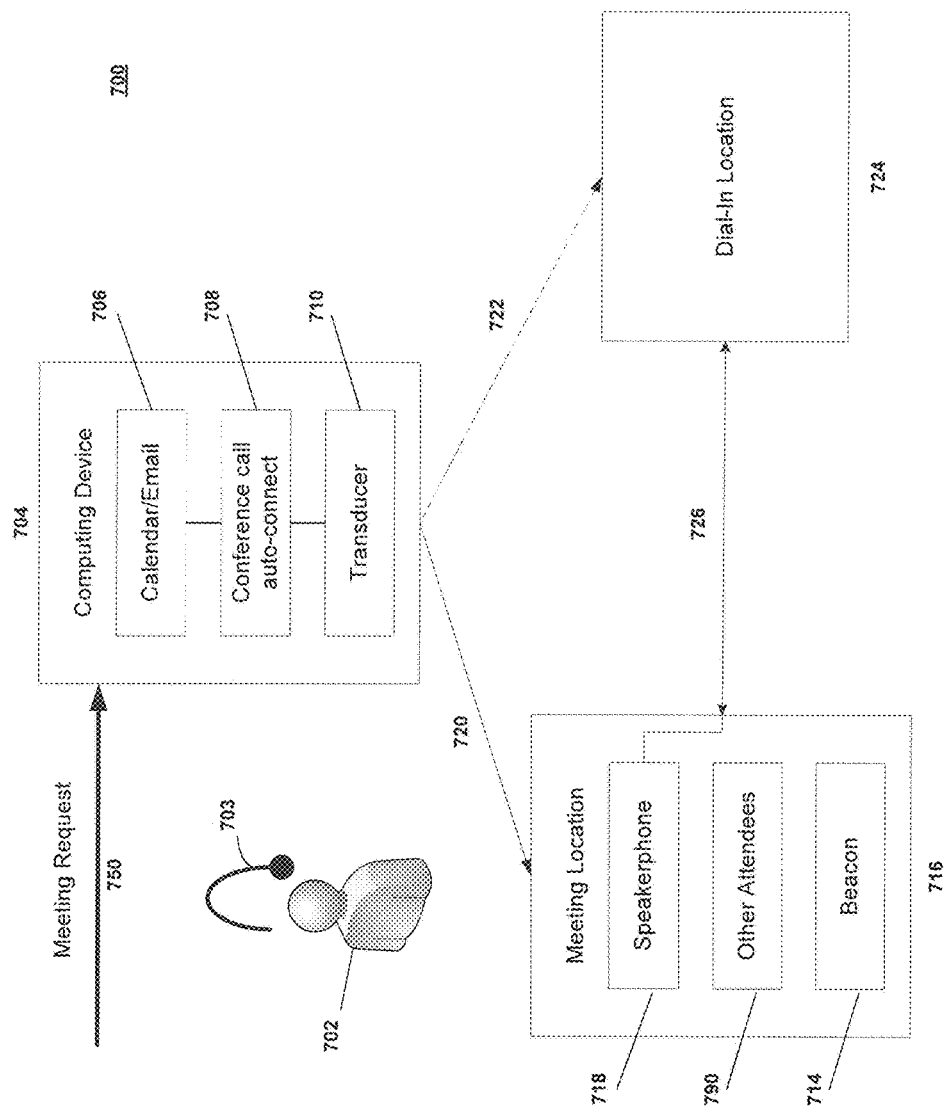

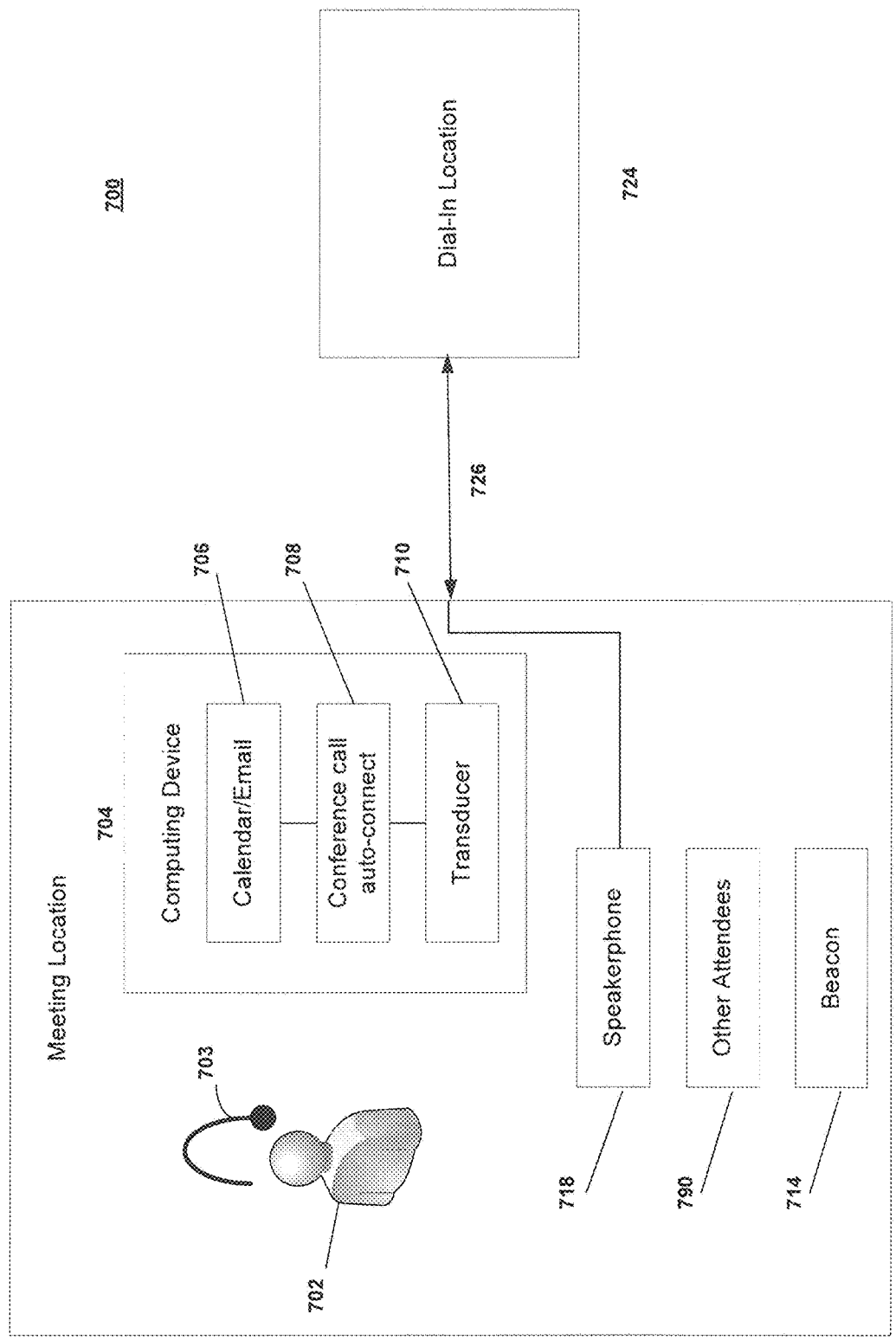

METHOD AND SYSTEMS FOR CONNECTION INTO CONFERENCE CALLS

BACKGROUND OF THE INVENTION

As the workforce becomes increasing distributed and mobile, many meetings are occurring with some participants calling (also referred to herein as "dialing in") into a conference call. For each participant dialed into the conference call, a leg (also referred to herein as "call leg" or "link") is established in the conference call.

Typically, potential attendees of the telephone conference call are sent invites via an office email/calendaring application (e.g. Microsoft Outlook) containing information relating to the meeting such as time, date, and place. It may also contain include a conference call dial-in telephone number (also referred to herein as "dial-in number" or "dial-in location") and a conference identification number. The request may also include a user identification number specific to the meeting request recipient that the attendee may enter once the call is connected.

In some cases, a majority of attendees meet in a physical location such as a conference room while a few remote attendees dial into a conference call. Typically, a speakerphone system is provided at the conference room to be communally utilized. To participate in the telephone conference call, attendees at the conference room must locate the dial-in number, conference identification number, and possibly user identification number at the time of the meeting. This requires an attendee to manually open the invite on his personal computer or mobile phone and enter the dial-in number at the speakerphone. Once the call is connected, the attendee must then enter the conference identification number and user identification number when prompted.

This process is cumbersome and has several limitations. The attendee must manually look up, remember, and key in the dial-in number. Often this process includes downtime while the attendee's computer is booting up or if the attendee needs to manually write down the number on paper to assist him in making the call. Also, the attendee may not be familiar with the conference room's speakerphone system. Once connected, the attendee must manually enter the conference identification number (also referred to herein as the "meeting identification number" or "conference call identification number") and user identification number if applicable. If the attendee makes a mistake in keying in any of these numerical strings, an error occurs and the attendee must begin again. As a result, there is a need for improved methods and system for connecting telephone conference call attendees.

SUMMARY OF THE INVENTION

Methods and apparatuses for auto-dialing and connection into conference calls are disclosed. The following description is presented to enable any person skilled in the art to make and use the invention. Descriptions of specific embodiments and applications are provided only as examples and various modifications will be readily apparent to those skilled in the art.

In one embodiment, a method for dialing into a conference call using a computing device having an audio transducer comprises receiving a meeting request at the computing device. Next, the contents of a meeting request are scanned to identify the presence and values of meeting information such as a meeting location, conference call dial-in number, conference call meeting identification number and user identification number.

Then, a call-back number is determined. In one embodiment a call-back number is determined by identifying a telephone number associated with the meeting location. For example, if scanning the meeting request reveals the meeting location is at the Chief Executive Officer's (CEO) office, then the call-back number will be assigned the value of the land-line telephone number at CEO's office. The telephone number associated with the meeting location can be identified by scanning a directory or address book, wherein the directory contains meeting location contact information. The directory can be located at the computing device or a remote server available to the attendee device.

In alternative embodiment, the call-back number can be determined by estimating the attendee's location at or near the time of the meeting. The attendee's location may be estimated by a beacon assisted position determination system. Once the attendee's location is determined, a telephone number associated with the attendee's location is identified. As described above, telephone number associated with the attendee's location may be found by scanning a directory or address book once the location is identified.

Upon determining the call-back number, a first call is established with a first remote device associated with conference call dial-in number. Next, the conference call meeting identification number is automatically transmitted over the first call. Optionally, the user identification number is also transmitted over the first call. Then a second call to a second device associated with the call-back number is initiated. When the second device accepts and the second call is established, the first call and second call are then linked (i.e., conferenced, first call and second call are call legs of the conference call) into the conference call.

In another embodiment, once the link between the first call and second call is established and the first remote device and second device are conferenced, the link between the first remote device and computing device may be terminated at the computing device. Finally, upon terminating the link between the first remote device and computing device, the first remote device and second device may remain linked into the conference call. Optionally the audio transducer at the attendee device may be muted or disabled upon establishing the link between the first and second call.

In one embodiment, a computer readable storage medium stores instructions that when executed by a computer cause the computer to perform a method for dialing into a conference call. The method performed by execution of the stored instructions includes scanning the contents of a meeting request to identify the presence and values of meeting information such as a meeting location, conference call dial-in number, conference call meeting identification number and user identification number. Next, a call-back number is determined by either scanning the contents of meeting request to identify a meeting location and further identify a telephone number associated with the meeting location. The telephone number associated with the meeting location may be determined by scanning a directory that includes meeting location contact information. The directory may be located at the computer or remote server. Alternatively the call-back number may be determined by estimating the attendee's location using a beacon assisted position determination system and identifying a telephone number associated with the attendee's location. As described above, the telephone number associated with the attendee's location may be found by scanning a directory or address book once the attendee's location is identified.

The method performed by the stored instructions further includes establishing a first call is with a first remote device associated with conference call dial-in number. Next, the conference call meeting identification number is transmitted over the first call. Optionally, the user identification number is also transmitted over the first call. Then a second call to a second device associated with the call-back number is initiated. When the second device accepts and the second call is established, the first call and second call are then linked (i.e., conferenced; first call and second call are call legs of the conference call). Upon establishing the link between the first call and second call (i.e., the first remote device and second device are linked), the link between the computing device and first remote device may be terminated. Upon terminating the link between the computing device and first remote device, the first remote device and second device may remain linked (i.e., remain in the conference call).

In another embodiment, a computing device for dialing into a conference call comprises an audio transducer and a processor. The audio transducer may be configured for audio communications. For example a microphone or loud speaker. The processor is configured to execute instructions. The computing device further comprises a computer readable storage medium storing instructions that when executed by the processor cause the computer to perform a method comprising scanning the contents of a meeting request to identify the presence and values of meeting information such as a meeting location, conference call dial-in number, conference call meeting identification number and user identification number. The method further comprises determining a call-back number. Next, a first call is established to a first remote device associated with the conference call dial-in number and the conference call meeting identification number and/or user identification number is transmitted over the first call. Then, a second call to a second device associated with the call-back number is initiated. Next, the first call and second call are linked responsive to the second call being accepted.

BRIEF DESCRIPTION OF THE DRAWINGS

FIG. 5A illustrates an address book containing meeting location information.

FIG. 7A-B illustrates a system for auto-dialing and connecting a conference room to a conference call.

DETAILED DESCRIPTION OF THE DRAWINGS

Figure 1:
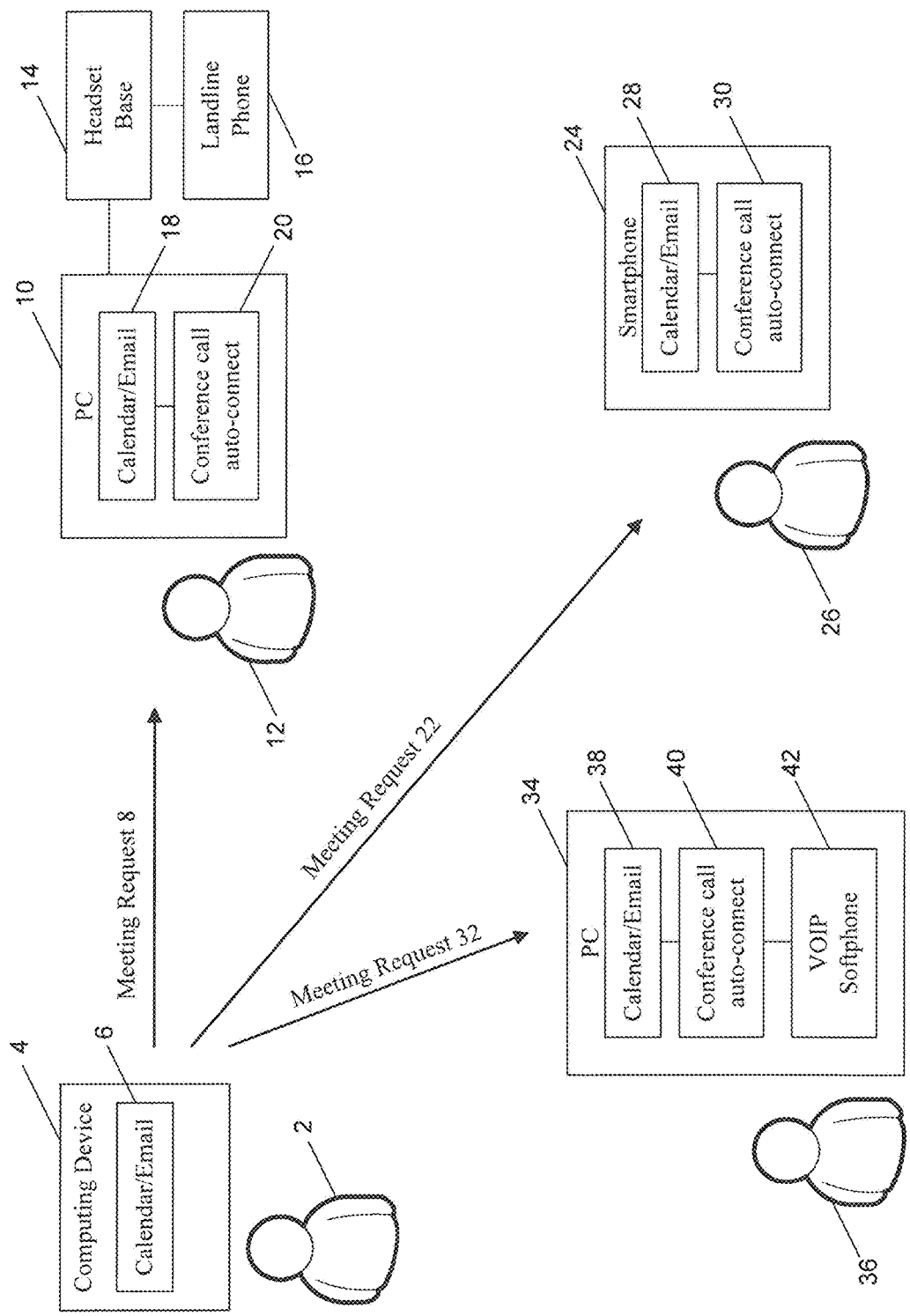
FIG. 1 illustrates receiving a meeting request at several types of attendee computing devices.

FIG. 1 illustrates the distribution of a meeting request of several types to different attendee computing devices. The meeting request can then be utilized to enable auto-dial in and connection into conference calls. A meeting organizer 2 at a computing device 4 sends out one or more meeting request notification messages to desired attendees using a calendaring/email application 6. The specific calendaring/email application 6 may vary. The meeting request notification message may be a specialized form utilized for meeting requests, or may simply be a standard email where the meeting organizer includes dial-in information somewhere in the email text. The meeting request notification message may be an email, SMS message, or other type of electronic message.

Where the meeting request is a specialized form, the recipient of the meeting request typically has the option of accepting or rejecting the meeting request, and the meeting request is placed on the recipient calendar (if accepted) using time and date information contained in the meeting request. In one example, the calendaring/email application 6 is a commercially available program such as Microsoft Outlook, Google Calendar, or comparable program. In one example, the meeting request is sent in the form of an email to the desired attendees, either from the email program or the calendar program. Computing device 4 may be any type of computing device capable of running the calendaring/email application 6 including, for example, a notebook computer, personal computer, PDA, or smartphone.

Figure 9:
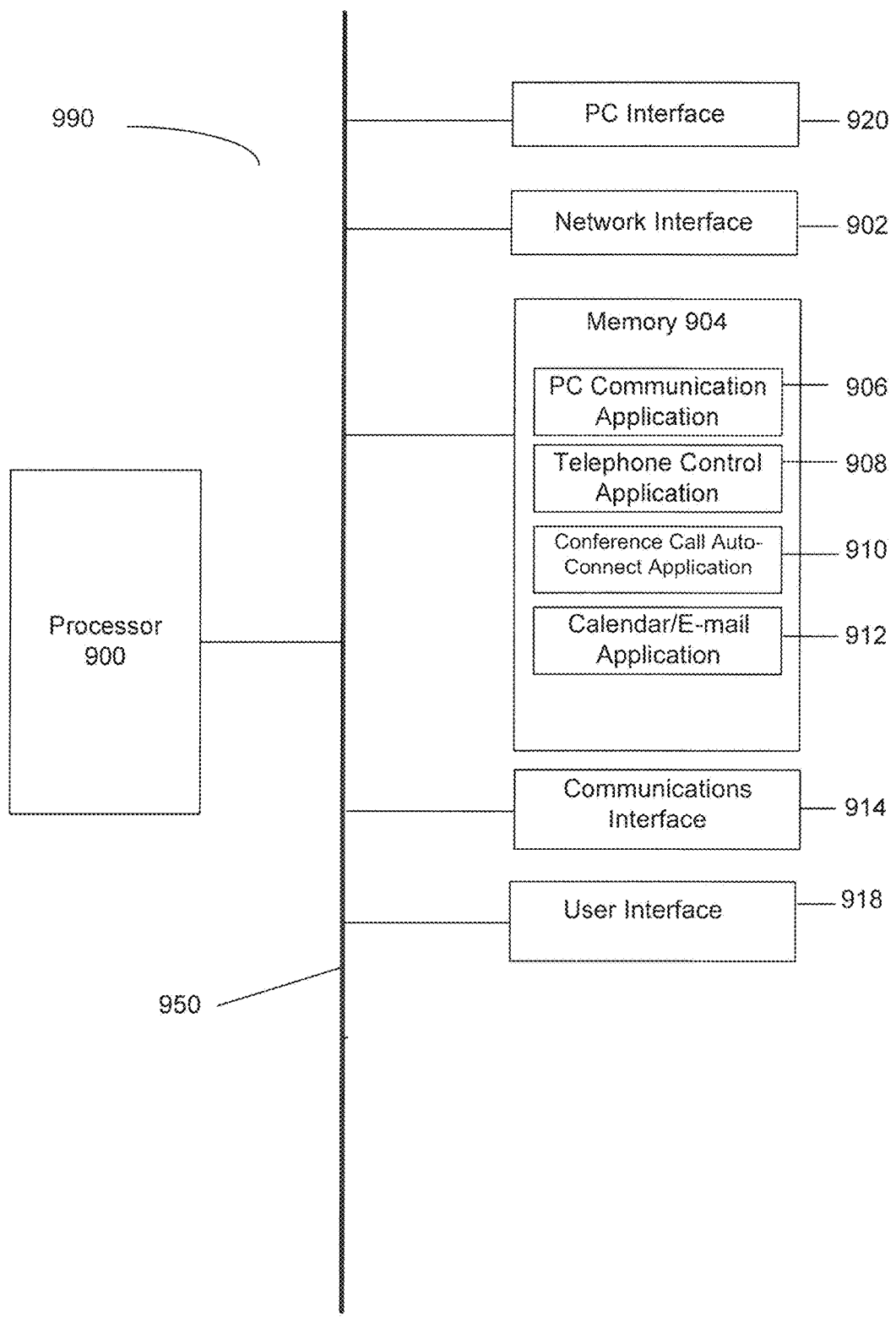
FIG. 9. illustrates a simplified block diagram of an attendee device.

The meeting request may be received by an attendee using a variety of types of computing devices 10, 34, 24. Generally, the computing devices may be any device capable of executing the applications described herein. Referring to FIG. 9 shown is a simplified block diagram of one embodiment of an attendee computing device 990. Attendee computing device 990 includes a processor 900 operably coupled via a bus 950 to a PC interface 920, network interface 902, memory 904, communications interface 914, and a user interface 918. In one example, communications interface 914 is a wireless communications transceiver and accompanying antenna for communication with a wireless headset or a telephone jack used to connect to a headset base station. In another example communications interface 914 is a full-duplex speakerphone system. PC interface 920 may, for example, be a USB interface. Network interface 902 may, for example, be an Ethernet jack used to connect attendee computing device 990 to a server over the Internet or a local area network.

Memory 904 may include a PC Communication Application 906, Telephone Control Application 908, Conference Call Auto-Connect Application 910, and Calendar/E-mail Application 912. In one example, the PC Communication Application 906 may manage the settings and operation of various devices (e.g. a headset, a handset, a USB speakerphone, etc.) connected to attendee device 990 via interfaces 920, 902, 914. Telephone control application 908 may be a commercially available VoIP application, such as Skype, to initiate calls. User interface application 912 allows for manual control between the attendee and attendee computing device 990 and in one example includes an audio and/or visual interface.

Processor 900 allows for processing data, in particular managing dial-in information between PC interface 920, communication interface 914, and network interface 902. Processor 900 may include a variety of processors (e.g., digital signal processors), with conventional CPUs being applicable. Memory 904 may include a variety of memories, and in one example includes SDRM, ROM, flash memory, or a combination thereof. Memory 904 may further include separate memory structures or a single integrated memory structure. In one example, memory 904 may be used to store passwords, network and telecommunications programs, and/or an operating system (OS). Memory 904 may also store data utilized by applications in memory 904. For example, memory 904 may contain an address book similar to that of FIG. 5 to be used by Conference Call Auto-Connect Application 910.

Referring again to FIG. 1, in one embodiment, a meeting request 8 sent by meeting organizer 2 is received by an attendee 12 at a personal computer 10, such as a desktop, tablet or notebook computer. The personal computer 10 executes a calendar/email application 18 operable to receive and open the meeting request 8. Personal computer 10 also executes a conference call auto-connect application 20 operable to perform the functions and processes described herein. In one example, conference call auto-connect application 20 is a plug-in application to the calendar/email application 18. In another example conference call auto-connect application 20 is a stand-alone application or web-based application capable of sharing data with the calendar/email application 18. A headset base system 14 is coupled to personal computer 10, and the headset base station 14 is also coupled to a landline telephone 16 connected to a telephone network such as a public switched telephone network (PSTN).

In another embodiment, a meeting request 22 is sent by meeting organizer 2 is received by potential attendee 26 at a smartphone 24. The smartphone 24 executes a calendar/email/SMS application 28 operable to receive and open the meeting request 22. The smartphone also executes a conference call auto-connect application 30 operable to perform the functions and processes described herein.

In a further embodiment, a meeting request 32 is sent by meeting organizer 2 is received by potential attendee 36 at a personal computer 34. The personal computer 34 executes a calendar/email application 38 operable to receive and open the meeting request 32. Personal computer 34 also executes a conference call auto-connect application 40 operable to perform the functions and processes described herein. A VoIP softphone 42 is in communication with call auto-connect application 40. In one example, conference call auto-connect application 20 is a plug-in application to the VoIP softphone 42 application.

In one embodiment, the conference call auto-connect application includes a text scanning module for processing a contents of a meeting request to identify the presence and values of meeting information such as a meeting location, conference call dial-in number, conference call meeting identification number and user identification number within the meeting request. For example, the text scanning module is a text recognition software application programmed to identify telephone numbers, identification numbers and meeting locations. The conference call auto-connect application also includes a dialing module for automatically calling the conference call dial-in number, automatically transmitting the conference call meeting identification number and calling other devices to bridge other attendees into the conference call as described in "Auto-Dial and Connection into Conference Calls" (U.S. Ser. No. 12/252,843), which is hereby incorporated into this disclosure by reference for all purposes.

Figure 2:
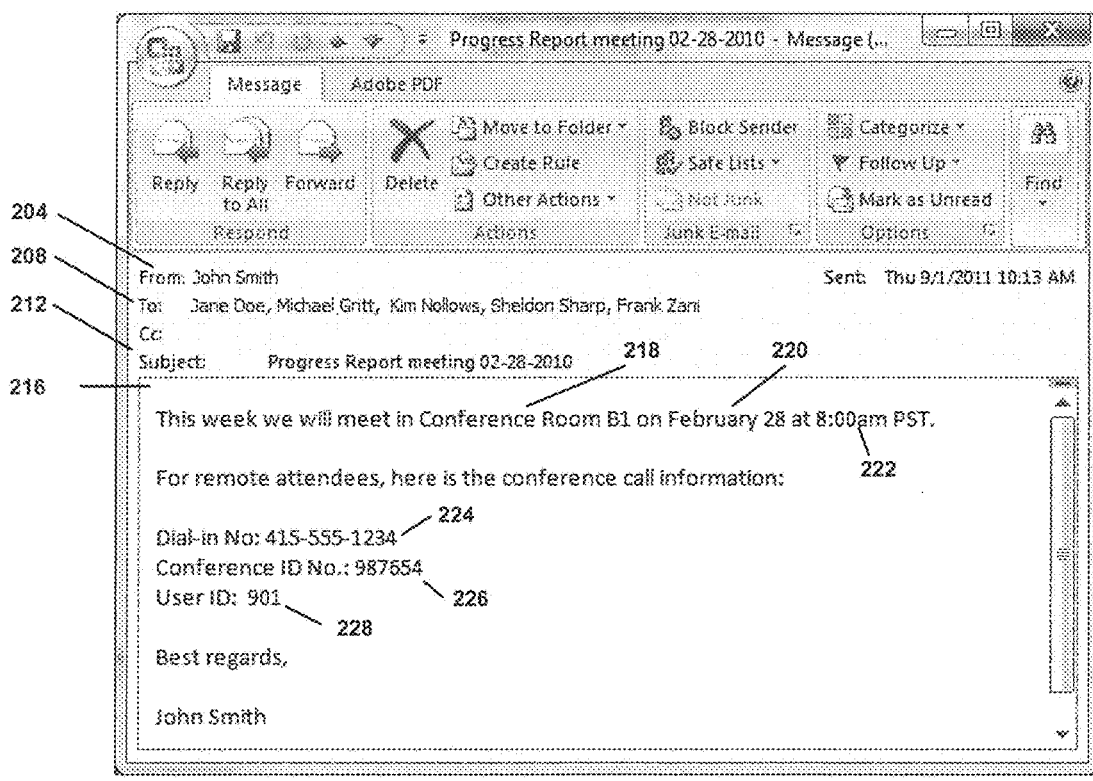
FIG. 2 illustrates a meeting request in the form of an electronic mail ("e-mail").

Referring to FIG. 2, shown is an electronic email meeting request 200 received at an attendee computing device. The meeting request 200 includes a 'From' field 204 identifying the meeting organizer, a 'To' field 208 identifying the potential attendees, and a 'Subject' field 312.

The meeting request 200 also includes a main body 216. The main body 216 or other similar multi-line text field typically contains the main body of the text written by the meeting organizer when composing the meeting request 200. The main body 216 may include meeting information such as a date 220 and time 222. For those attendees that will meet at a physical location, the main body 216 includes a meeting location 218. For those attendees joining the meeting via conference call, the meeting organizer included a conference call dial-in number 224, conference identification number 226, and user identification number 228 in the main body 216. In an alternative embodiment, one or more of the meeting parameters may be placed in a field other than the main body 216. For example, the date 218 and time 220 may be placed in the 'Subject' field 212. Furthermore, the dial-in number 224, conference identification number 226, and user ID number 228, while contained in the meeting request, may not be specifically referred to or identified by name or abbreviated names. For example, the meeting organizer may assume that simply by providing a telephone number somewhere in the meeting request, the attendee will recognize that this is the dial-in number for the conference call without the need for it to be so labeled.

Figure 3:
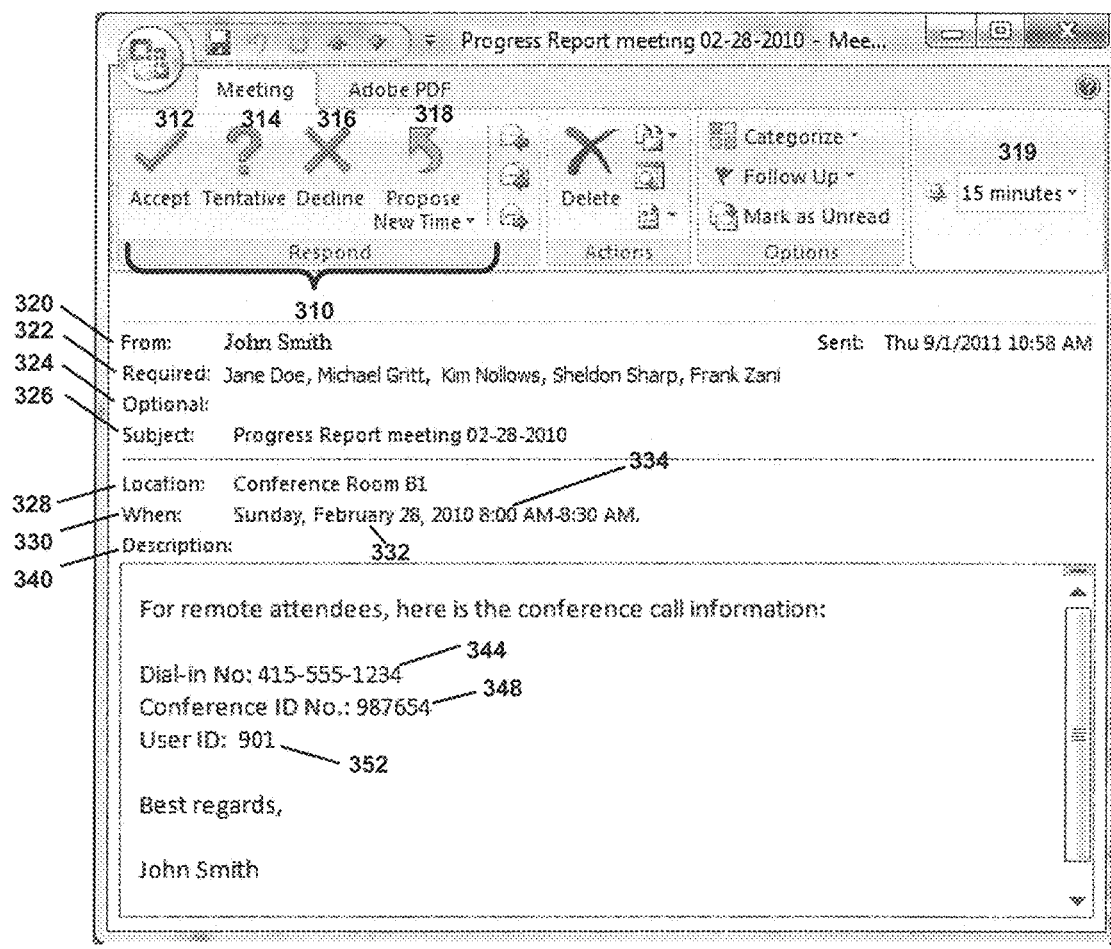
FIG. 3 illustrates a meeting request in the form of a calendar event.

Referring to FIG. 3, shown is a calendar event meeting request 300 received at an attendee computing device. The meeting request 300 includes a set of Respond options 310 including Accept 312, Tentative 314, Decline 316 and Propose New Time 318 which the attendee may select in response to the request. Reminder field 319 allows the attendee to select a time prior to the meeting to be reminded. In the example shown, the attendee will be reminded 15 minutes before the scheduled start time. The meeting request 300 also includes a 'From' field 320, 'Required' field 322 identifying the required attendees for the meeting, 'Optional' field 324 identifying the optional attendees for the meeting, 'Subject' field 326, 'Location' field 328 identifying a physical location where some attendees will meet and 'When' field identifying the time 334 and date 332 for the meeting. Furthermore, the meeting request 300 includes 'Description' field 340.

The 'Description' field 340 may contain text written by the meeting organizer when composing the meeting request. In this embodiment, the meeting organizer has included conference call information in the 'Description' field 340 for remote attendees. The conference call information includes a conference call dial-in number 344, conference identification number 348, and user identification number 352.

Figure 4:
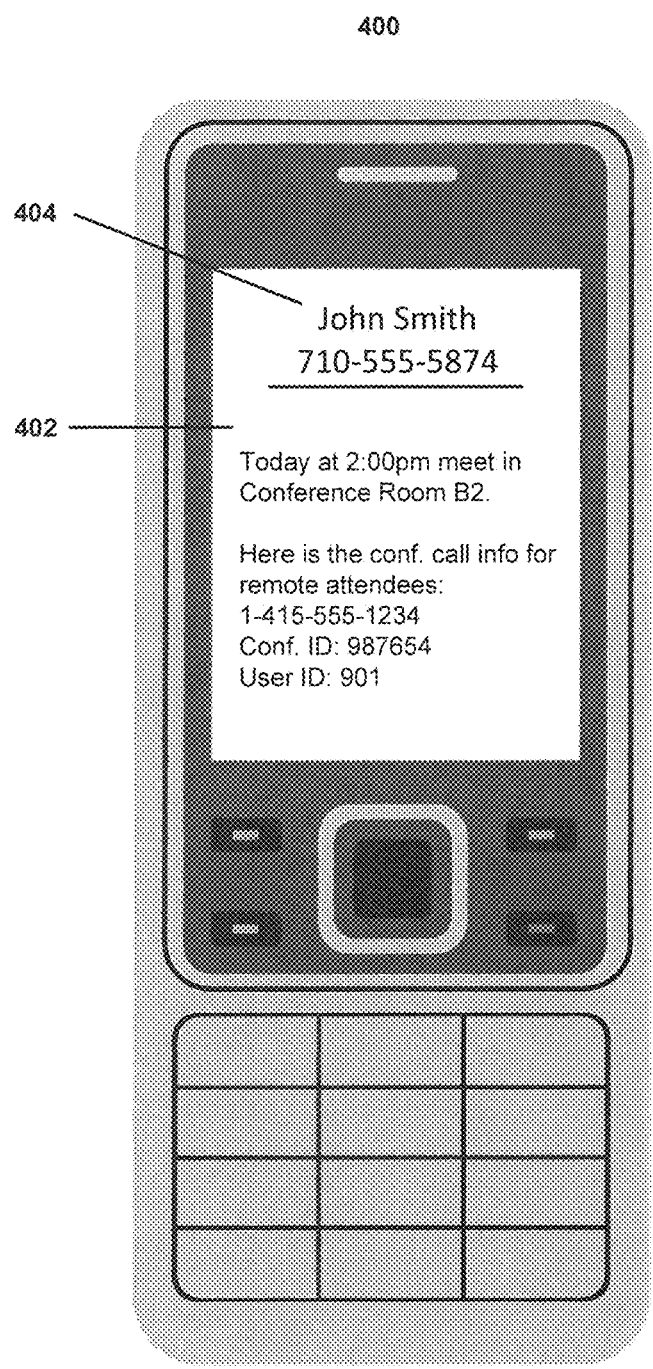
FIG. 4 illustrates a meeting request in the form of a short message service (SMS).

Referring to FIG. 4, shown is a SMS meeting request 400 received at a mobile phone. The meeting request 400 includes a sender field 404 and a main body 402. The main body 402 may include a description with meeting items similarly described in FIG. 2 and FIG. 3.

After reviewing the meeting request, the attendee may choose to accept the meeting request. Referring again to FIG. 3 wherein a calendar event is received, the user may accept using the Accept response 312 command. Alternatively, the attendee may also choose one of the other Respond options 310. If the attendee accepts the meeting request, a calendar event associated with the meeting is placed on the attendee calendar at the meeting date and time. Referring again to FIG. 2 and FIG. 4 wherein no Respond options are available, the conference call auto-connect application may scan the text fields containing information input by the organizer to identify meeting information and create a new calendar event. For example, the conference call auto-connect application may scan the email of FIG. 2 and identify the 'From' field 204, 'To' field 208, 'Subject' field 212, location 218, date 220 and time 222. Next, the conference call auto-connect application can generate a new calendar event similar to that of FIG. 4 wherein the appropriate and corresponding fields are automatically populated (i.e. data identified at Location 218 populates 'Location' field 328). Thereafter the user may choose to accept the meeting request using Respond options 310.

Upon accepting the request, the conference call auto-connect application at the attendee device determines whether the meeting request contains a request for a telephone conference call meeting. Referring again to FIG. 2, in one example, the main body 216 containing information input by the organizer is scanned (i.e., processed) to identify whether a dial-in number and conference identification number are contained anywhere in the meeting request. Thus, the meeting organizer may put the dial-in information in any of several text fields. The main body 216 may also be scanned to identify whether a user identification number is contained anywhere in the meeting request. For example, select keywords may be scanned for such as "dial-in", "meeting number", or "user id" and numerical strings following such keywords identified. Alternatively, numerical strings may be scanned for and identified as a telephone number if containing the appropriate number of digits or in a standardized telephone number format.

If a dial-in number is recognized, the meeting request is classified as a telephone conference meeting. If recognized, the date, time, dial-in number, conference identification number, and/or user identification number are stored in memory at the attendee device for later use by the conference call auto-connect application.

Furthermore, the conference call auto-connect application also determines a call-back number. A call-back number may be a telephone number the attendee would like to use for the telephone conference call, allowing the attendee to select a desired telephony device to participate in the conference call with. In one embodiment, the call-back number is associated with the meeting location. In the examples of FIGS. 2-4, a "face-to-face" meeting is requested at "Conference Room B1" while remote attendees will participate in the meeting via conference call. Referring again to FIG. 3, the 'Location' field 328 is scanned to identify a physical location where attendees will meet.

Figure 5B:
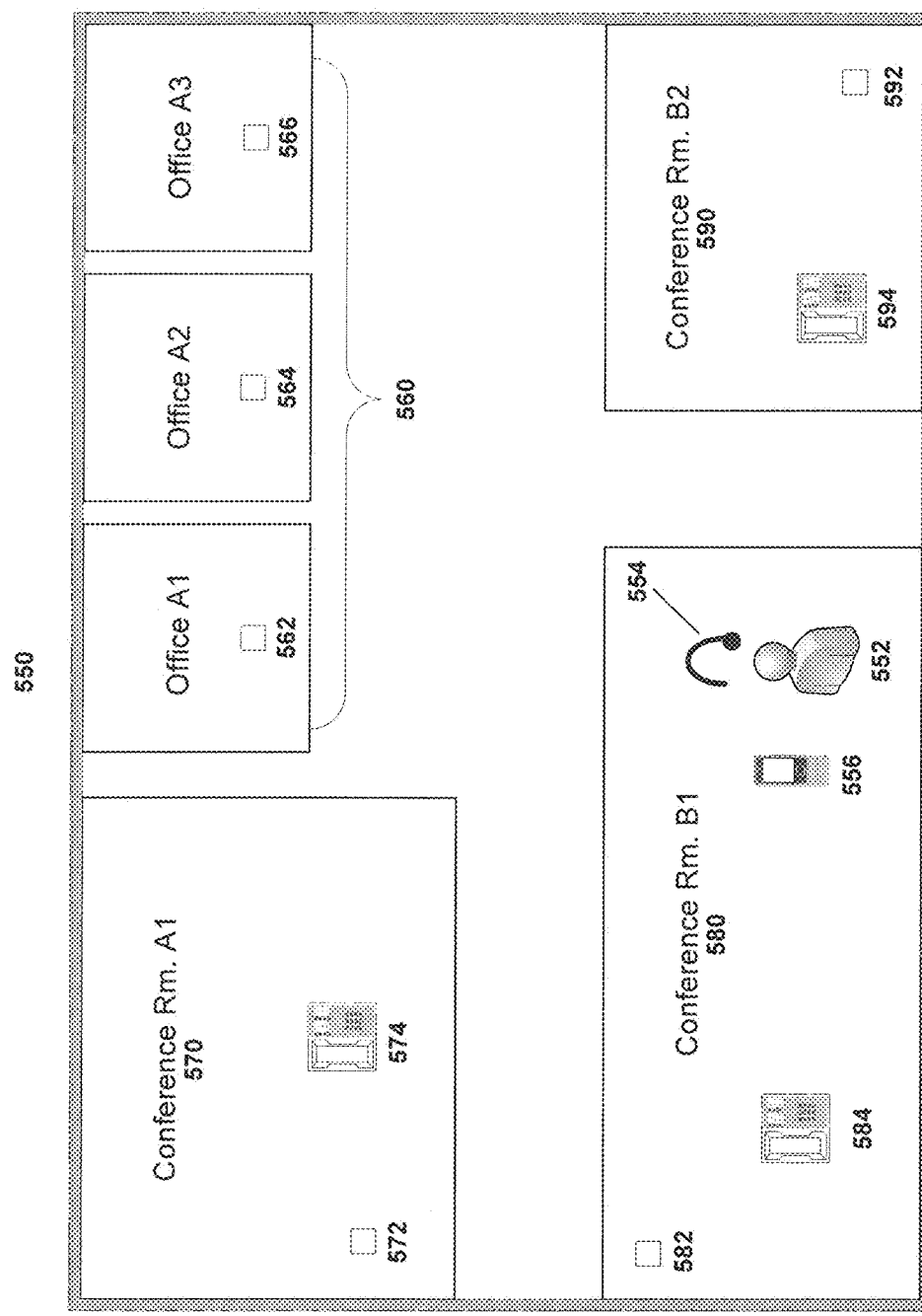
FIG. 5B illustrates an office building configured to estimate an attendee's location.

The meeting organizer may populate the 'Location' field 328 manually by typing in text. Alternatively, the meeting organizer can select a location from an address book. FIG. 5A illustrates an address book 500 containing a directory of the rooms (i.e., "conference rooms" and "offices") in the office building of FIG. 5B. The address book 500 may be a feature of the office calendar/e-mail application. The address book 500 may be located on a remote server (e.g. Microsoft Exchange/Active Directory), the meeting organizer's computing device, and/or the attendee's computing device. The address book 500 includes a listing of room names 510, room locations 515, room telephone numbers 520, room capacity 525, room descriptions 530, and other identifying data such as room e-mail addresses 535. When creating the meeting request, the meeting organizer can populate the 'Location field' 328 by selection a room in the address book 500.

To determine the call-back number, the conference call auto-connect application may scan the 'Location' field 328 to identify a room. The conference call auto-connect application may then search for that room in address book 500 and retrieve the room telephone number 520 associated with that room. Alternatively, the conference call auto-connect may query a remote server for the room telephone number 520. The call-back number is assigned the room telephone number 520 value and may be stored in memory at the attendee's computing device for later use by the conference call auto-connect application.

In another embodiment, the call-back number may be determined by the location of the attendee at or near the time of the meeting. For example, an attendee's location can be estimated by a beacon assisted position determination system as described in "Methods and Apparatuses for Beacon Assisted Position Determination System" (US Patent Application Publication 2008/0280624A1) and "Methods and Apparatus for Determining the Position of a Mobile Terminal Using Localized Source Assistance Information" (US Patent Application Publication 2005/0052318A1) which are hereby incorporated into this disclosure by reference for all purposes.

A facility equipped with beacons can be configured to be discoverable by the attendee's computing device. The location of each individual beacon device must be recorded and known to the attendee's computing device or an associated server's database. The beacon location data can be recorded manually when the beacon is deployed. The identity of each beacon can be ascertained by a variety of methods such as a MAC address or IP address. The attendee's computing device can record each of the beacons it can detect and its received signal strength. It then compares that information against the database, and/or sends the information to a server for comparison. From that comparison the attendee's location is determined.

Referring to FIG. 5B, shown is a diagram of an office building 550 having several rooms including offices 560 and conference rooms 570,580,590. Each room is equipped with at least one discoverable, wireless Bluetooth beacon 562, 564, 566, 572, 582, 592. At the time of a meeting, an attendee 552 is located in Conference Room B1 580 having a discoverable Bluetooth beacon 582 and speakerphone system 584. The attendee 522 is carrying a Bluetooth equipped headset 554 and Bluetooth equipped mobile phone 556. It will be appreciated that other wireless location determining systems such as satellite positioning systems, cell tower triangulation, RSSI, and Wi-Fi can be also used. As described above, either the headset 554 or mobile phone 556 can detect beacon 582.

In one embodiment, the mobile phone 556 detects and identifies the beacon 582 by Bluetooth MAC address. The conference call auto-connect application on the mobile phone 556 checks a database containing each beacon's MAC address and identifier associated with the specific location of the beacon. The database can be located at the mobile phone 556 or remote server. Furthermore, the database can reference or correlate with an address book similar to that of FIG. 5A. In this example, Conference Room B1 580 is associated with beacon 582. The conference call auto-connect application may then identify a telephonic device, such as speaker phone 584, and it's associated telephone number with Conference Room B1 584. The speaker phone 584 associated telephone number value is assigned to the call-back number at the attendee's computing device for later use by the conference call auto-connect application. Note further that the telephonic device may include video or other capabilities but should at a minimum be capable of being addressed using an identifier, such as a telephone number, to receive an audio call.

Figure 6:
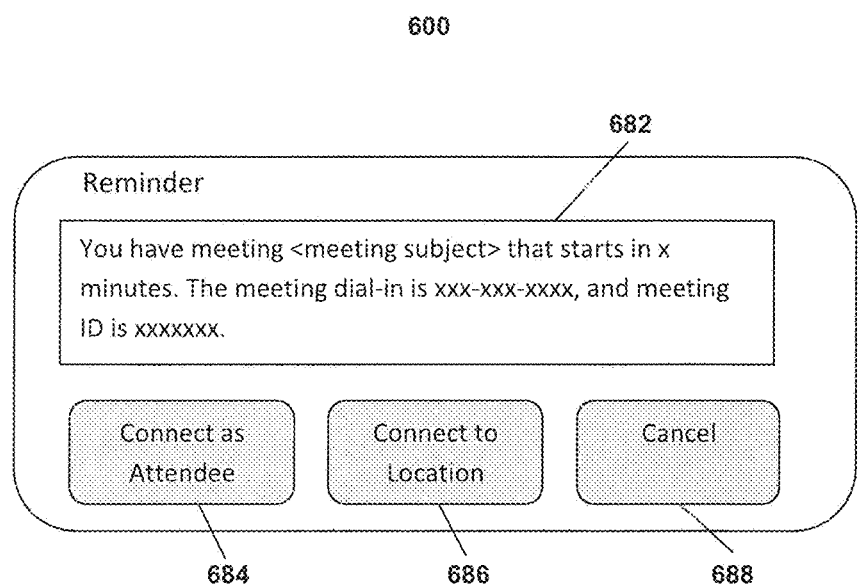
FIG. 6 illustrates a conference call reminder and instruction prompt.
Figure 8A:
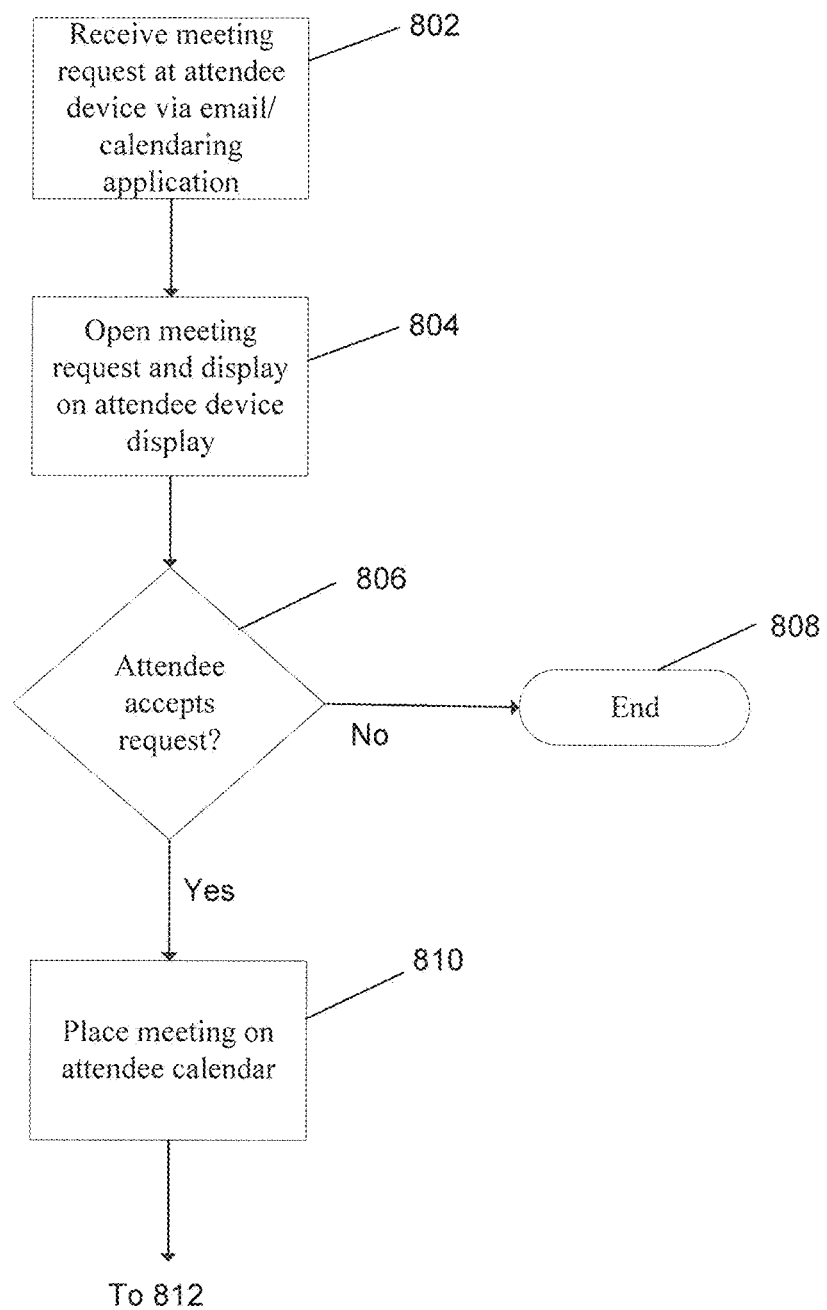
FIGS. 8A-E are a flow chart diagram illustrating auto-dialing and connecting a conference room to a conference call.
Figure 8B:
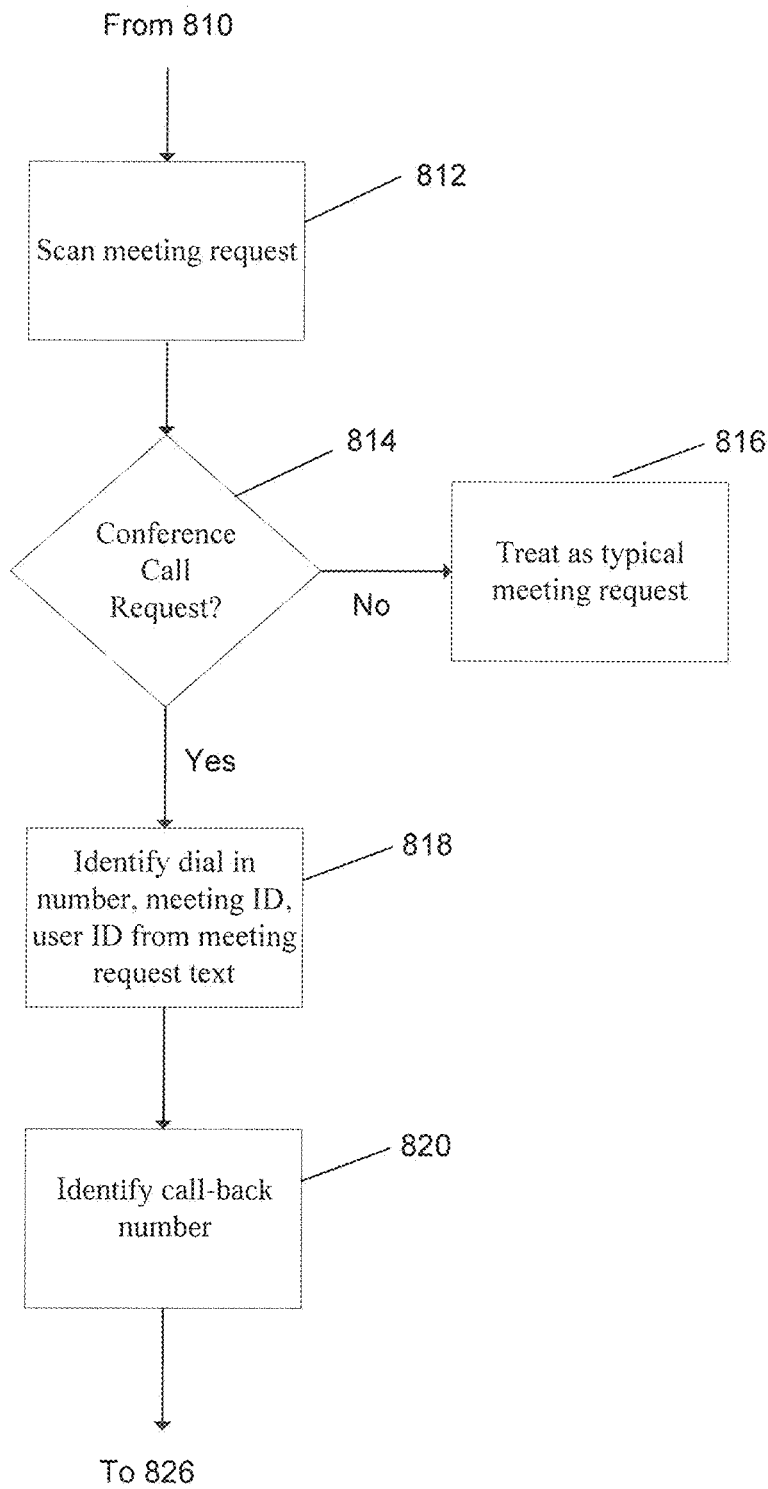
Figure 8C:
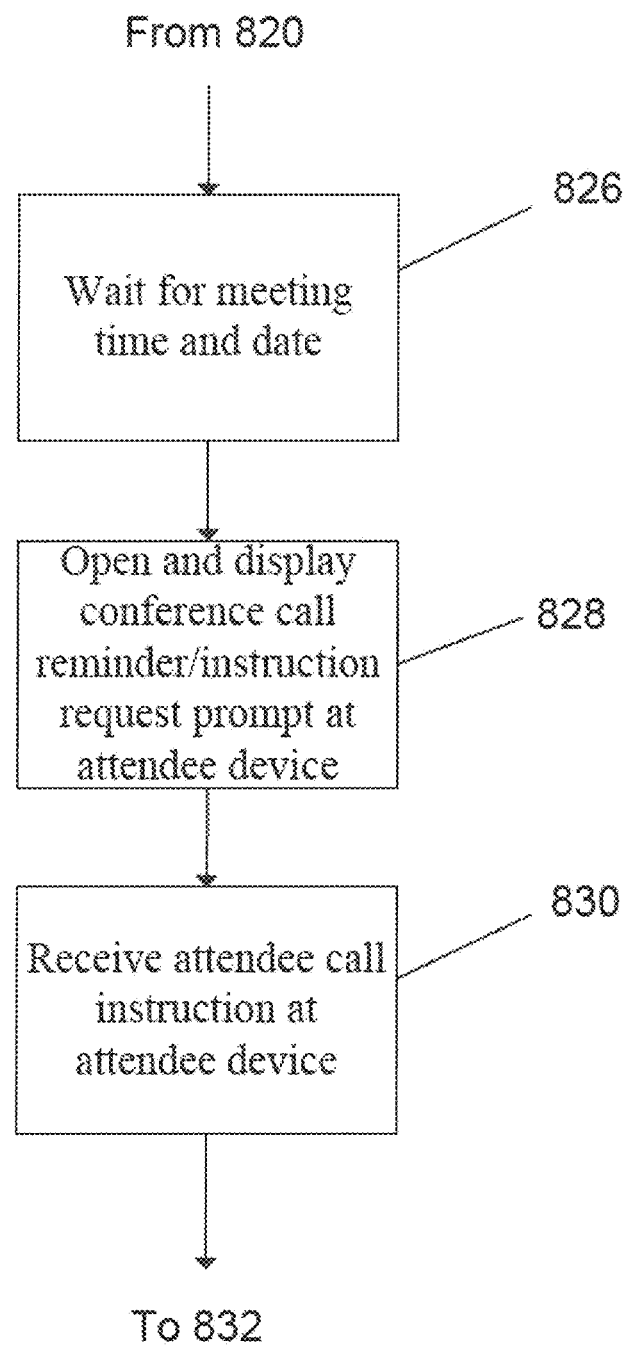
Figure 8D:
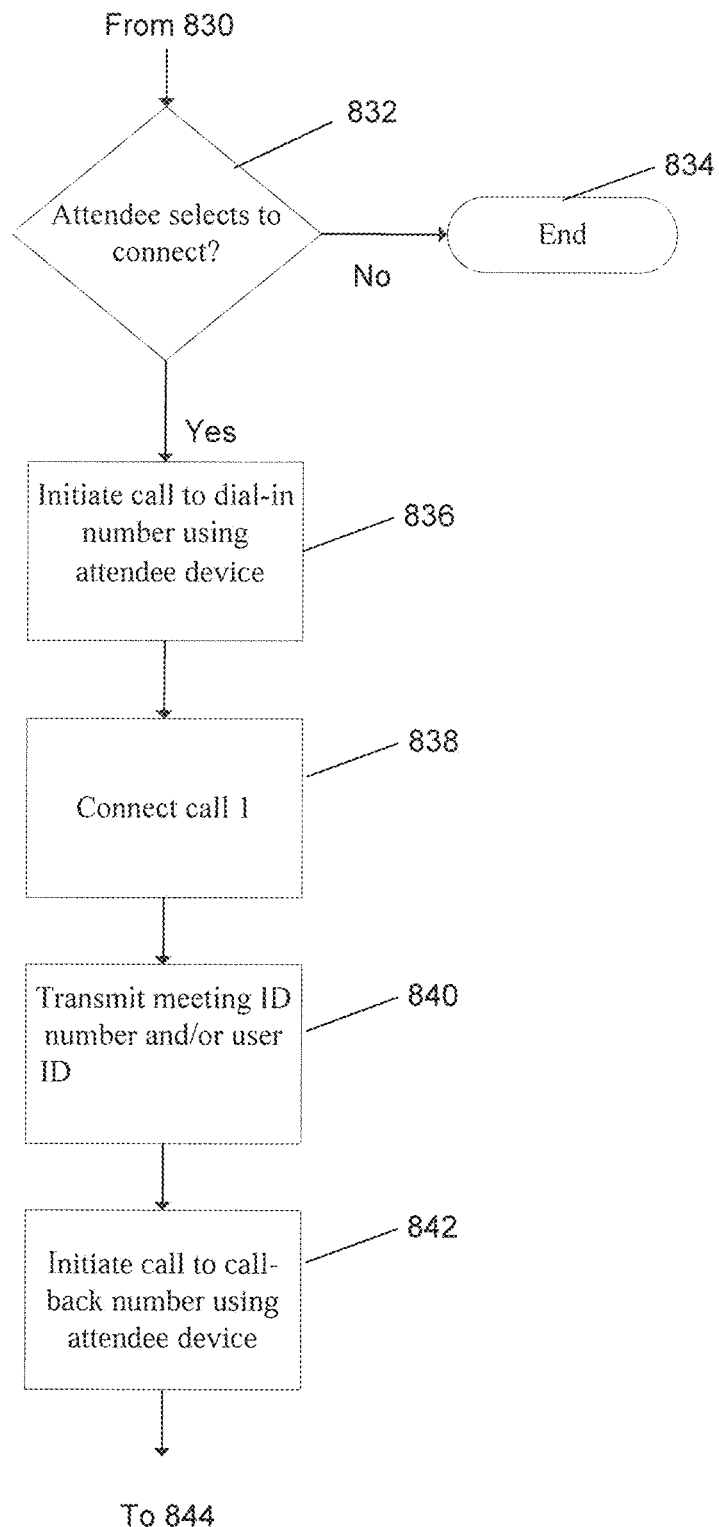
Figure 8E:
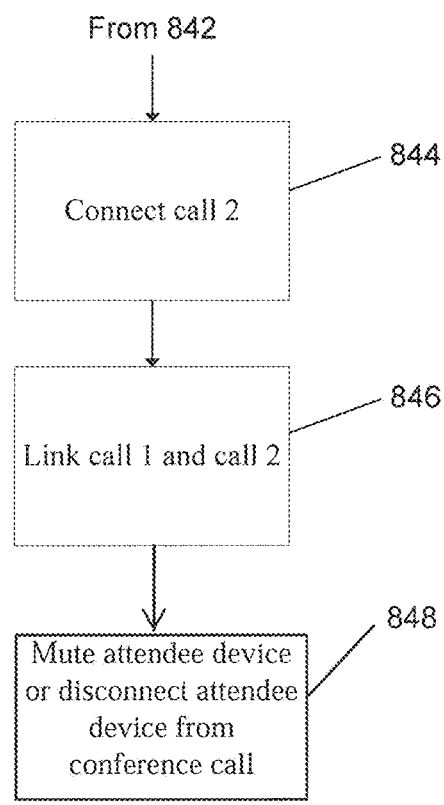

If the attendee has selected to be reminded of the calendar item, at the pre-determined reminder time a reminder is displayed on the attendee computing device. Where the received meeting request has been previously identified as a telephone conference call meeting, the reminder consists of a conference call reminder/instruction request prompt. Referring to FIG. 6, shown is a conference call reminder/instruction request prompt 600. The conference call reminder/instruction request prompt 600 includes an information field 682 informing the attendee of the upcoming conference call, and may include the meeting subject and previously identified meeting location, dial-in number, and conference identification number. The conference call reminder/instruction request prompt 600 presents several options that the attendee may select. In the example shown in FIG. 6, the attendee may choose to connect as an attendee 684, connect to location 686, or cancel 688 the conference call. Where the attendee does not have the option of connecting to a location (e.g., a meeting location was not present or determined), the conference call reminder/instruction request prompt 600 presents only a single connect option and a cancel option.

FIG. 7A illustrates a system 700 for auto-dialing a location into a conference call in one embodiment of the invention. System 700 includes a computing device 704 executing a calendar/email application 706 and conference call auto-connect application 708 performing functions described herein. In one example, computing device 704 also includes a transducer 710 that may be used for audio communications such as a microphone or speaker.

An attendee 702 receives a meeting request 750 sent by a meeting organizer Upon acceptance of the meeting request 750 by attendee 702, conference call auto-connect application 708 processes the meeting request to identify whether it contains a telephone conference call meeting.

The calendar/email application 706 places a calendar event corresponding to the accepted meeting request on the calendar at the meeting date and time. The conference call auto-connect application 708 scans the text fields of the meeting request to identify the meeting location, dial-in number, conference identification number, and/or user identification number and stores them in memory. The conference call auto-connect application 708 also determines a call-back number corresponding to a speakerphone 718 located at the meeting location 716 by referencing a directory containing information associated with the meeting location 716. Alternatively, the conference call auto-connect application 708 may determine the call-back number based on attendee's 702 physical location utilizing beacon 714 and headset 703 as described above.

At the designated meeting date and time, the conference call auto-connect application 708 automatically calls the dial-in-number. The attendee 702 may receive a conference call reminder/instruction request prompt as discussed previously to confirm whether the attendee wishes to connect to or cancel the telephone conference call. In this embodiment, the attendee 702 selects to "connect to location."

The conference call auto-connect application 708 retrieves the previously stored dial-in number from memory and initiates a call 722 to dial-in location 724. Dial-in location 724 may, for example, be a telephone conference bridge or other service center. Upon connection with the dial-in location 724, conference call auto-connect application 708 retrieves the conference identification number and/or user identification number from memory at and transmits them to dial-in location 724 to connect (i.e., gain admission or join) to the conference call. Upon connection with the dial-in location 724, the conference call auto-connect application 708 retrieves the previously stored callback number from memory and initiates a call 720 to speaker phone 718.

Upon connection with speaker phone 718, call auto-connect application 708 links call 720 with call 722 to form a link 726 between speakerphone 718 and dial-in location 724 (i.e. call 720 and 722 are now call legs of the conference call). Advantageously, the speaker phone 718 need not run any additional conference call software for the auto-connect process to occur. Furthermore, attendee 702 does not need to be present at meeting location 716 when call auto-connect application 708 and initiates call 720 to speaker phone 718 if other attendees 790 are present to "pick up" call 720.

In one embodiment of the invention, upon formation of direct link 726, call auto-connect application 708 may automatically terminate call 722 (i.e. the call leg between the computing device 704 and dial-in location 724) as shown in FIG. 7B. In this embodiment, attendee 702 is at the meeting location 716 with computing device 704 and does not require a link between computing device 704 and dial-in location 724 once link 726 is established. Alternatively, call auto-connect application 708 may deactivate or mute transducer 710 while maintaining call 722 as to prevent audio feedback or echoing with speakerphone 718.

FIGS. 8A-E are flow diagrams illustrating auto-dialing and connecting a meeting location into conference calls in a further example of the invention. For example, the process illustrated may be implemented by system 700 shown in FIG. 7. At block 802, an attendee receives a meeting request at an attendee device via an email/calendaring application executed on the attendee device. For example, the attendee computing device is a personal computer, smartphone, or any other computing device capable of connection to a communications network and executing an email/calendaring application. In one example, the meeting request is received via email. In further examples, the meeting request may be in the form of other types of electronic messages, such as SMS or calendar event messages. At block 804, upon opening by the attendee, the meeting request is displayed on the attendee computing device. The meeting request includes a proposed date and time, and a prompt for the attendee to accept or reject the meeting request. At decision block 806, an accept meeting instruction or a reject meeting instruction is then received from the attendee. If the attendee does not accept the meeting request (i.e., responds with a reject meeting instruction), at block 808 the conference call connect process ends.

If the attendee accepts the meeting request (i.e., responds with an accept meeting instruction), at block 810 the meeting request is placed on the attendee calendar at the proposed date and time as a calendar item. At block 812, the meeting request text is scanned. At decision block 814, it is determined whether the meeting request contains a request for a telephone conference call. For example, if a conference call dial-in number is identified at block 812, the meeting request is classified as a telephone conference call. If no at decision block 814, at block 816 the meeting request is classified and treated as an in-person only meeting and the conference call connect process ends.

If yes at decision block 814, the meeting location, conference call dial-in number, conference call meeting identification number, and user identification number are identified from the meeting request at block 818. Depending upon the nature of the conference call and the specific attendee receiving the meeting request, a user identification number may or may not be included in the meeting request.

At block 820, an address book or other location directory or database containing meeting location information is searched to determine a callback number and is stored in memory at the attendee computing device.

At block 826, the calendar/email application waits for the calendar item scheduled date and time. At block 828, a meeting reminder is opened and displayed on the attendee computing device at the proposed date and time or a predetermined period prior to the proposed date and time. The meeting reminder serves to both remind the attendee of the upcoming telephone conference call and prompt the attendee to enter a call instruction confirming or cancelling his desire to participate in the telephone conference call. At block 830, a telephone conference call confirmation instruction or cancellation instruction is received from the attendee. At decision block 832, it is determined whether the attendee has selected to connect to a location into the conference call. If no at decision block 832, at block 834 the conference call connect process terminates.

If yes at decision block 832, at block 836, the dial-in number is retrieved from memory at the scheduled date and time and automatically called by the attendee computing device. At block 838, a network connection is established with a remote device corresponding to the dial-in location to connect the first call. At block 840, the conference call meeting identification number is transmitted over the network connection to the remote dial-in location by the attendee computing device. If available, the user identification number is also automatically transmitted over the network connection.

At block 842, the call-back number is retrieved from memory and called by the attendee computing device. Alternatively, a call-back number can be assigned by estimating the nearest telephonic device to the attendee the time of the meeting if a meeting location was not identified or found at block 820. At block 844, a network connection is established by the attendee computing device with a telephonic device associated with the call-back number to connect the second call. Advantageously, the telephonic device corresponding to the call-back number may be a mobile phone, landline phone, or VoIP phone. At block 846, the attendee computing device links the first call and the second call so that the telephonic device associated with the call-back number is linked to the dial-in location, enabling the attendee to participate in the conference call. In a further example, the call-back number is called first, and the dial-in number called second by the attendee computing device. Optionally, at block 848 the attendee's computing device may be muted or disconnected from the conference call when a conference call link between call 1 and call 2 is established.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of computing devices used by meeting attendees; the type of communication network used by the telephones; standards to perform the VoIP call setup, signaling, and control; user interface input mechanisms to control conference or hookswitch operation at the headset. For example, the communications network used may be a PSTN, a public or private data network, wireline or wireless network, or the Internet. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP telephone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Detailed Description of the Drawings as an embodiment of the invention.

What is claimed is:

1. A method for conference calling comprising:
   electronically scanning the contents of a meeting request to identify a conference call dial-in number;
   determining a call-back number comprising electronically scanning the contents of the meeting request to identify a physical meeting location and identifying a telephone number for an identified telephony device at the physical meeting location;
   establishing a first call on a first communications link to a telephony device associated with the conference call dial-in number;
   electronically transmitting the conference call meeting identification number over the first call on the first communications link;
   establishing a second call on a second communications link to the identified telephony device associated with the call-back number; and
   linking the first call on the first communications link and the second call on the second communications link responsive to the second call being accepted.

2. The method of claim 1, wherein identifying the telephone number for the identified telephony device at the physical meeting location comprises scanning a directory, wherein the directory includes meeting location contact information.

3. The method of claim 2, wherein the directory is located at the computing device.

4. The method of claim 2, wherein the directory is located at a remote server.

5. The method of claim 1, wherein determining a call-back number further comprises determining a current location of a meeting attendee at or near a time of the meeting time and identifying a telephone number for a telephone at the current location of the meeting attendee at or near the time of the meeting time.

6. The method of claim 5, wherein identifying the telephone number for the telephone at the current location of the meeting attendee at or near the time of the meeting time comprises scanning a directory, wherein the directory includes location contact information.

7. The method of claim 5, wherein the attendee's location is estimated by a beacon assisted position determination system.

8. The method of claim 1, further comprising muting an audio transducer at a user telephony device utilized in the first call and the second call following linking the first call and the second call.

9. The method of claim 1, further comprising
   identifying a user conference identification number; and transmitting the user conference identification number over the first call.

10. The method of claim 1, further comprising terminating the first call and the second call at a user telephony device.

11. The method of claim 10, wherein the first call and the second call are maintained following linking the first call and the second call.

12. The method of claim 10, further comprising muting the transducer responsive to linking the first call and second call.

13. One or more non-transitory computer readable storage medium storing instructions that when executed by one or more computers cause the one or more computers to perform operations comprising:
    electronically scanning the contents of a meeting request to identify a conference call dial-in number;
    determining a call-back number at or near the time of a meeting time comprising determining a current location of a meeting attendee at or near the time of the meeting time utilizing a locating device and identifying a telephone number for an identified telephony device at the current location of the meeting attendee at or near the time of the meeting time;
    establishing a first call on a first communications link to a telephony device associated with the conference call dial-in number;
    electronically transmitting the conference call meeting identification number over the first call on the first communications link; and
    establishing a second call on a second communications link to the identified telephony device associated with the call-back number.

14. The one or more non-transitory computer readable storage medium of claim 13, wherein determining a call-back number further comprises scanning the contents of a meeting request to identify a meeting location and identifying a telephone number associated with the meeting location.

15. The one or more non-transitory computer readable storage medium of claim 14, wherein identifying a telephone number associated with the meeting location further comprises scanning a directory, wherein the directory includes meeting location contact information.

16. The one or more non-transitory computer readable storage medium of claim 15, wherein the directory is located at the computer.

17. The one or more non-transitory computer readable storage medium of claim 15, wherein the directory is located at a remote server.

18. The one or more non-transitory computer readable storage medium of claim 13, wherein identifying the telephone number for the identified telephony device at the current location of the meeting attendee comprises scanning a directory, wherein the directory includes location contact information.

19. The one or more non-transitory computer readable storage medium of claim 13, wherein the locating device comprises a beacon assisted position determination system.

20. The one or more non-transitory computer readable storage medium of claim 13, further comprising terminating the first call and the second call at a user telephony device.

21. The one or more non-transitory computer readable storage medium of claim 13, wherein the first call and the second call are maintained simultaneously.

22. A telephony computing device for dialing into a conference call comprising:
    a network interface;
    an audio transducer;
    a processor;
    a computer readable storage medium storing instructions that when executed by the processor cause the telephony computing device to perform operations comprising:
        electronically scanning the contents of a meeting request to identify a conference call dial-in number;
        determining a call-back number comprising electronically scanning the contents of the meeting request to identify a physical meeting location, and identifying a telephone number for an identified telephony device at the meeting location;
        establishing a first call to a telephony device associated with the conference call dial-in number from the telephony computing device;
        electronically transmitting the conference call meeting identification number over the first call;
        establishing a second call to the identified telephony device associated with the call-back number from the telephony computing device; and
        linking the first call and the second call responsive to the second call being accepted.

* * * * *